(12) United States Patent
Riegel et al.

(10) Patent No.: US 6,559,239 B1
(45) Date of Patent: May 6, 2003

(54) METHOD FOR THE SECONDARY CROSS-LINKING OF HYDROGELS WITH N-ACYL-2-OXAZOLIDINONES

(75) Inventors: Ulrich Riegel, Frankfurt (DE); Matthias Weismantel, Jossgrund (DE); Volker Frenz, Mainz-Kostheim (DE); Thomas Daniel, Chesapeake, VA (US); Fritz Engelhardt, Chesapeake, VA (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/831,920

(22) PCT Filed: Nov. 18, 1999

(86) PCT No.: PCT/EP99/08860
§ 371 (c)(1),
(2), (4) Date: May 29, 2001

(87) PCT Pub. No.: WO00/31152
PCT Pub. Date: Jun. 2, 2000

(30) Foreign Application Priority Data

Nov. 26, 1998 (DE) .......................................... 198 54 574

(51) Int. Cl.$^7$ ................................................. C08F 8/30
(52) U.S. Cl. ............................... 525/329.7; 525/329.9; 525/375; 524/556; 524/560; 524/561
(58) Field of Search ........................... 525/329.7, 329.9, 525/375; 524/556, 560, 561

(56) References Cited

U.S. PATENT DOCUMENTS

| | | | |
|---|---|---|---|
| 4,056,502 A | 11/1977 | Gross | |
| 4,666,983 A | 5/1987 | Tsubakimoto et al. | |
| 5,331,059 A | 7/1994 | Engelhardt et al. | |
| 5,385,983 A | 1/1995 | Graham | |
| 6,297,335 B1 | * 10/2001 | Funk et al. | ............... 526/317.1 |
| 6,414,214 B1 | * 7/2002 | Engelhadt et al. | ........... 604/368 |

FOREIGN PATENT DOCUMENTS

| | | |
|---|---|---|
| BE | 645 195 | 9/1964 |
| DE | 198 07 502 | 9/1999 |
| EP | 0 083 022 | 7/1983 |
| EP | 0 349 935 | 1/1990 |
| EP | 0 372 981 | 6/1990 |
| EP | 0 530 438 | 3/1993 |
| EP | 0 543 303 | 5/1993 |
| FR | 2 304 630 | 10/1976 |
| WO | WO 94/09043 | 4/1994 |
| WO | WO 97/49687 | 12/1997 |

\* cited by examiner

*Primary Examiner*—D. R. Wilson
(74) *Attorney, Agent, or Firm*—Oblon, Spivak, McClelland, Maier & Neustadt, P.C.

(57) ABSTRACT

Liquid-absorbent polymers are prepared by a process for the gel and/or surface postcrosslinking of water-absorbent polymers by the polymer being treated with a surface postcrosslinking solution and being postcrosslinked and dried during and after the treatment by raising the temperature, wherein the surface postcrosslinking solution comprises as crosslinker a compound of the formula I

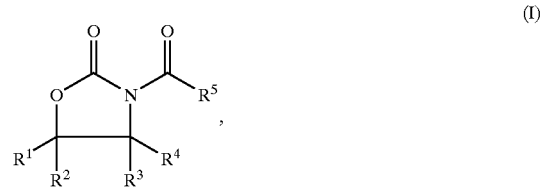

(I)

where $R^1$, $R^2$, $R^3$ and $R^4$ are independently hydrogen, $C_1$–$C_{12}$-alkyl, $C_1$–$C_{12}$-alkenyl, $C_6$–$C_{12}$-aryl or $C_1$–$C_{12}$-alkoxy, $R^5$ is $C_1$–$C_{16}$-alkyl, $C_1$–$C_4$-hydroxyalkyl, $C_6$–$C_{12}$-aryl, $C_1$–$C_{16}$-alkenyl or a group of the formula —$(CH_2)_n$—COOH or —$(CH_2)_n$—$SO_3H$ in the form of the acid or a respective metal salt, ammonium salt or triethanolammonium salt thereof or —$(CH_2$—$CH_2$—$O$—$)_m$—$R^6$, $R^6$ is hydrogen or $C_1$–$C_{16}$-alkyl, n is from 1 to 10, m is from 1 to 20 dissolved in an inert solvent, and are used in hygiene articles, packaging materials and nonwovens.

14 Claims, No Drawings

METHOD FOR THE SECONDARY CROSS-LINKING OF HYDROGELS WITH N-ACYL-2-OXAZOLIDINONES

The present invention relates to a process for the gel or surface postcrosslinking of water-absorbent hydrogels with N-acyl-2-oxazolidinones, the polymers thus obtainable and their use in hygiene articles, packaging materials and nonwovens.

Hydrophilic, highly swellable hydrogels are in particular polymers of (co)polymerized hydrophilic monomers, graft (co)polymers of one or more hydrophilic monomers on a suitable grafting base, crosslinked cellulose or starch ethers, crosslinked carboxymethylcellulose, partly crosslinked polyalkylene oxide or natural products that are swellable in aqueous fluids, for example guar derivatives. Such hydrogels are used as products for absorbing aqueous solutions in the manufacture of diapers, tampons, sanitary napkins and other hygiene articles, and as water retainers in market gardening.

To improve application properties, for example diaper rewet and absorbency under load (AUL), hydrophilic, highly swellable hydrogels are generally surface or gel postcrosslinked. This postcrosslinking is preferably carried out in the aqueous gel phase or as surface postcrosslinking of the ground and classified polymer particles.

Useful crosslinkers for this purpose include compounds containing at least two groups capable of entering covalent bonds with the carboxyl groups of the hydrophilic polymer. Useful compounds include for example di- or polyglycidyl compounds, such as diglycidyl phosphonate, alkoxysilyl compounds, polyaziridines, polyamines or polyamidoamines, and these compounds can also be used in mixtures with each other (see for example EP-A-0 083 022, EP-A-0 543 303 and EP-A-0 530 438). Polyamidoamines useful as crosslinkers are described in EP-A-0 349 935 in particular.

A major disadvantage of these crosslinkers is their high reactivity, since it necessitates particular precautions in production to avoid undesirable side effects. Moreover, the aforementioned crosslinkers have skin-irritating properties, which makes their use in hygiene articles problematical.

Known crosslinkers also include polyfunctional alcohols. For instance, EP-A-0 372 981, U.S. Pat. No. 4,666,983 and U.S. Pat. No. 5,385,983 teach the use of hydrophilic polyalcohols and the use of polyhydroxy surfactants. The reaction is carried out at 120–250° C. The process has the disadvantage that the esterification which leads to crosslinking is very slow even at such temperatures.

Prior German Patent Application DE-A-19 807 502 describes a process for postcrosslinking with 2-oxazolidinones.

It is an object of the present invention to provide gel or surface postcrosslinking equivalent to or superior to the prior art by using relatively inert compounds capable of reacting with carboxyl groups. This object is to be achieved with a very short reaction time and a very low reaction temperature.

We have found that this object is achieved, surprisingly, when N-acyl-2-oxazolidinones are used as crosslinkers. More particularly, the moderate reactivity of the crosslinkers can be boosted with inorganic or organic acidic catalysts. Useful catalysts include known inorganic mineral acids, their acidic salts with alkali metals or ammonium and also their corresponding anhydrides. Useful organic catalysts include known carboxylic acids, sulfonic acids and amino acids.

The invention accordingly provides a process for the gel and/or surface postcrosslinking of water-absorbent polymers by the polymer being treated with a surface postcrosslinking solution and being postcrosslinked and dried during and after the treatment by raising the temperature, wherein the surface postcrosslinking solution comprises as crosslinker a compound of the formula I

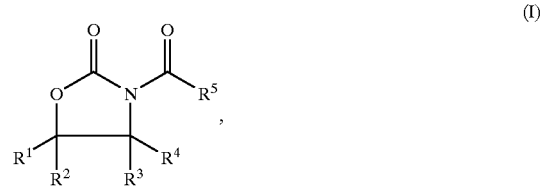

(I)

where
$R^1$, $R^2$, $R^3$ and $R^4$ are independently hydrogen, $C_1$–$C_{12}$-alkyl, $C_1$–$C_{12}$-alkenyl, $C_6$–$C_{12}$-aryl or $C_1$–$C_{12}$-alkoxy,
$R^5$ is $C_1$–$C_{16}$-alkyl, $C_1$–$C_4$-hydroxyalkyl, $C_6$–$C_{12}$-aryl, $C_1$–$C_{16}$-alkenyl or a group of the formula —$(CH_2)_n$—COOH, —$(CH_2)_n$—$SO_3H$ or —$(CH_2$—$CH_2$—O—$)_m$—$R^6$, and
$R^6$ is hydrogen or $C_1$–$C_{16}$-alkyl,
n is from 1 to 10,
m is from 1 to 20,
dissolved in an inert solvent.

When $R^5$ is —$(CH_2)_n$—COOH or —$(CH_2)_n$—$SO_3H$, the formula I crosslinker described can also be present in ionic form, preferably as sodium or potassium salt. The crosslinker may also be present in the form of further metal salts, for example with $Al^{3+}$, $Mg^{2+}$, $Li^+$, $Ca^{2+}$, $La^{3+}$, $Ti^{2+/4+}$, $Zn^{2+}$ or $Fe^{2+/3+}$. It can also be present in the form of ammonium salts or triethanolammonium salts. A particularly preferred crosslinker of the formula I is N-acetyl-2-oxazolidinone.

The postcrosslinking and drying temperature is preferably 50–250° C., especially 50–200° C., most preferably 100–180° C. The surface postcrosslinking solution is preferably sprayed onto the polymer in suitable spray mixers. Following spray application, the polymer powder is dried thermally, and the crosslinking reaction can take place not only before but also during the drying. Preference is given to spray application of a solution of the crosslinker in reaction mixers or mixing and drying systems such as, for example, Lödige mixers, BEPEX® mixers, NAUTA® mixers, SHUGGI® mixers or PROCESSALL®. Moreover, fluidized-bed dryers may also be used.

Drying may take place in the mixer itself, by heating the outer casing or by blowing hot air in. It is similarly possible to use a downstream dryer such as a tray dryer, a rotary tube dryer or a heatable screw. But it is also possible, for example, to use an azeotropic distillation as a drying technique. The preferred residence time at this temperature in the reaction mixer or dryer is less than 60 minutes, particularly preferably less than 30 minutes.

In a preferred embodiment of the invention, the reaction is speeded by adding an acidic catalyst to the surface postcrosslinking solution. Useful catalysts for the process of the invention include all inorganic acids, their corresponding anhydrides, and organic acids. Examples are boric acid, sulfuric acid, hydroiodic acid, phosphoric acid, tartaric acid, acetic acid and toluenesulfonic acid. More particularly their polymeric forms, anhydrides and also the acidic salts of the polybasic acids are also suitable. Examples of these are boron oxide, sulfur trioxide, diphosphorus pentoxide and ammonium dihydrogenphosphate.

The crosslinker is dissolved in inert solvents. The crosslinker is used in an amount of from 0.01 to 5.0%, preferably from 0.05 to 0.5%, by weight, based on the polymer used. The preferred inert solvent is water or a mixture of water with mono- or polyhydric alcohols. However, it is also possible to use any unlimitedly water-miscible organic solvent which is not itself reactive under the process conditions. When an alcohol-water mixture is used, the alcohol content of this solution is for example 10–90% by weight, preferably 30–70% by weight, especially 40–60% by weight. Any alcohol of unlimited miscibility with water can be used, as can mixtures of two or more alcohols (eg. methanol+glycerol+water). The alcohol mixtures may contain the alcohols in any desired mixing ratio. However, it is particularly preferable to use the following alcohols in aqueous solution: methanol, ethanol, isopropanol, ethylene glycol and particularly preferably 1,2-propanediol and 1,3-propanediol.

In a further preferred embodiment of the invention, the surface postcrosslinking solution is used in a ratio of 1–20% by weight, based on the mass of the polymer. Particular preference is given to a solution quantity of 0.5–10% by weight, based on the polymer.

The invention further provides crosslinked water-absorbent polymers that are obtainable by the process according to the invention.

The hydrophilic, highly swellable hydrogels to be used in the process of the invention are in particular polymers of (co)polymerized hydrophilic monomers, graft (co)polymers of one or more hydrophilic monomers on a suitable grafting base, crosslinked cellulose or starch ethers or natural products swellable in aqueous fluids, for example guar derivatives. These hydrogels are known to one skilled in the art and are described for example in U.S. Pat. No. 4,286.082, DE-C-27 06 135, U.S. Pat. No. 4,340,706, DE-C-37 13 601, DE-C-28 40 010, DE-A-43 44 548, DE-A-40 20 780, DE-A-40 15 085, DE-A-39 17 846, DE-A-38 07 289, DE-A-35 33 337, DE-A-35 03 458, DE-A-42 44 548, DE-A-42 19 607, DE-A-40 21 847, DE-A-38 31 261, DE-A-35 11 086, DE-A-31 18 172, DE-A-30 28 043, DE-A-44 18 881, EP-A-0 801 483, EP-A-0 455 985, EP-A-0 467 073, EP-A-0 312 952, EP-A-0 205 874, EP-A-0 499 774, DE-A 26 12 846, DE-A-40 20 780, EP-A-0 205 674, U.S. Pat. No. 5,145,906, EP-A-0 530 438, EP-A-0 670 073, U.S. Pat. No. 4,057,521, U.S. Pat. No. 4,062,817, U.S. Pat. No. 4,525,527, U.S. Pat. No. 4,295,987, U.S. Pat. No. 5,011,892, U.S. Pat. No. 4,076,663 or U.S. Pat. No. 4,931, 497. The content of the aforementioned patent documents is expressly incorporated herein by reference. Examples of hydrophilic monomers useful for preparing these hydrophilic, highly swellable hydrogels are polymerizable acids, such as acrylic acid, methacrylic acid, vinylsulfonic acid, vinylphosphonic acid, maleic acid including its anhydride, fumaric acid, itaconic acid, 2-acrylamido-2-methylpropanesulfonic acid, 2-acrylamido-2-methylpropanephosphonic acid and its amides, hydroxyalkyl esters and amino- or ammonium-containing esters and amides and also the alkali metal and/or ammonium salts of monomers containing acid groups. Also water-soluble N-vinylamides such as N-vinylformamide or else diallyldimethylammonium chloride. Preferred hydrophilic monomers are compounds of the general formula II

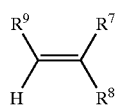
(II)

where
R$^7$ is hydrogen, methyl or ethyl,
R$^8$ is —COOR$^{10}$, hydroxysulfonyl or phosphonyl, a (C$_1$–C$_4$)-alkanol-esterified phosphonyl group or a group of the formula III

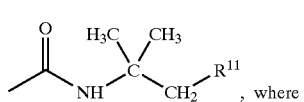
(III)
, where

R9 is hydrogen, methyl, ethyl or carboxyl,
R$^{10}$ is hydrogen, amino-(C$_1$–C$_4$)-alkyl or hydroxy-(C$_1$–C$_4$)-alkyl, alkali metal or ammonium ion and
R$^{11}$ is hydroxysulfonyl, phosphonyl or carboxyl
or an alkali metal or ammonium salt of each of these.
Examples of C$_1$–C$_4$-alkanols are methanol, ethanol, n-propanol, isopropanol or n-butanol.

Particularly preferred hydrophilic monomers are acrylic acid and methacrylic acid and also their alkali metal and ammonium salts, for example sodium acrylate, potassium acrylate or ammonium acrylate.

Useful grafting bases for hydrophilic hydrogels obtainable by, graft copolymerization of olefinically unsaturated acids or their alkali metal or ammonium salts may be of natural or synthetic origin. Examples are starch, cellulose or cellulose derivatives and also other polysaccharides and oligosaccharides, polyalkylene oxides, in particular polyethylene oxides and polypropylene oxides, and also hydrophilic polyesters.

Useful polyalkylene oxides have for example the formula IV

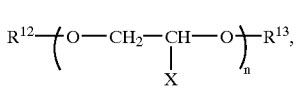
(IV)

where
R$^{12}$ and R$^{13}$ are independently hydrogen, alkyl, alkenyl or aryl,
x is hydrogen or methyl, and
n is an integer from 1 to 10,000.
R$^{12}$ and R$^{13}$ are each preferably hydrogen, (C$_1$–C$_4$)alkyl, (C$_2$–C$_6$)alkenyl or phenyl.

Preferred hydrogels are in particular polyacrylates, polymethacrylates and also the graft polymers described in U.S. Pat. No. 4,931,497, U.S. Pat. No. 5,011,892 and U.S. Pat. No. 5,041,496.

The hydrophilic, highly swellable hydrogels are preferably in crosslinked form; that is, they include compounds having at least two double bonds which have been copolymerized into the polymer network. Suitable crosslinkers are in particular N,N'-methylene-bisacrylamide, N,N'-methylenebismethacrylamide, esters of unsaturated mono- or polycarboxylic acids of polyols, such as diacrylate or triacrylate, examples being the diacrylates and dimethacrylates of butanediol and of ethylene glycol, and trimethylolpropanetriacrylate, and also allyl compounds such as allyl (meth)acrylate, triallyl cyanurate, diallyl maleate, polyallyl esters, tetraallyloxyethane, triallylamine, tetra-allylethylenediamine, allyl esters of phosphoric acid and also vinylphosphonic acid derivatives as described for example in EP-A-0 343 427. In the process of the invention, however, particular preference is given to hydrogels prepared using polyallyl ethers as crosslinkers and by acidic homopolymerization of acrylic acid. Suitable crosslinkers are pentaerythritol tri-and tetraallyl ether, polyethylene glycol diallyl ether, monoethylene glycol diallyl ether, glycerol di- and triallyl ether, polyallyl ethers based on sorbitol and also ethoxylated variants thereof.

The water-absorbent polymer is preferably a polymeric acrylic acid or a polyacrylate. This water-absorbent polymer may be prepared by a process known from the literature. Preference is given to polymers containing crosslinking comonomers in amounts of 0.001–10 mol %, preferably 0.01–1 mol %, but very particular preference is given to polymers obtained by free-radical polymerization using a polyfunctional ethylenically unsaturated free-radical crosslinker which additionally bears at least one free hydroxyl group (eg. pentaerythritol triallyl ether or trimethylolpropane diallyl ether).

The hydrophilic, highly swellable hydrogels are preparable by conventional polymerization processes. Preference is given to addition polymerization in aqueous solution by the process known as gel polymerization. In this process from 15 to 50% strength by weight aqueous solutions of one or more hydrophilic monomers and optionally of a suitable grafting base are polymerized in the presence of a free-radical initiator, preferably without mechanical mixing, utilizing the Trommsdorff-Norrish effect (Makromol. Chem. 1, 169 (1947)). The polymerization reaction may be carried out in the temperature range from 0° C. to 150° C., preferably from 10° C. to 100° C., not only at atmospheric pressure but also at elevated or reduced pressure. As customary, the polymerization may also be carried out in a protective gas atmosphere, preferably under nitrogen. The polymerization may be initiated using high-energy electromagnetic radiation or the customary chemical polymerization initiators, for example organic peroxides, such as benzoyl peroxide, tert-butyl hydroperoxide, methyl ethyl ketone peroxide, cumene hydroperoxide, azo compounds such as azodiisobutyronitrile and also inorganic peroxy compounds such as $(NH_4)_2S_2O_8$, $K_2S_2O_8$ or $H_2O_2$. They may if desired be used in combination with reducing agents such as sodium hydrogensulfite and iron(II) sulfate or redox systems where the reducing component is an aliphatic or aromatic sulfinic acid, such as benzenesulfinic acid or toluenesulfinic acid or derivatives thereof, such as Mannich adducts of sulfinic acids, aldehydes and amino compounds as described in DE-A-1 301 566. The qualities of the polymers may be further improved by postheating the polymer gels for a number of hours within the temperature range from 50 to 130° C., preferably from 70 to 100° C.

The gels obtained are neutralized for example to the extent of 0–100 mol %, preferably 25–100 mol %, particularly preferably 50–85 mol %, based on monomer used, for which the customary neutralizing agents can be used, preferably alkali metal hydroxides, alkali metal oxides or the corresponding alkali metal carbonates, but particularly preferably sodium hydroxide, sodium carbonate or sodium bicarbonate.

Neutralization is customarily effected by mixing in the neutralizing agent as an aqueous solution or else, preferably, as a solid. For this purpose the gel is mechanically comminuted, by means of a mincer for example, and the neutralizing agent is sprayed on, scattered over or poured on and then carefully mixed in. To effect homogenization, the resultant gel mass may be passed through the mincer again a number of times. The neutralized gel mass is then dried with a belt dryer or roller dryer until the residual moisture content is less than 10% by weight, especially below 5% by weight. The dried hydrogel is then ground and sieved, the customary grinding apparatus being roll mills, pin mills or vibratory mills. The preferred particle size of the sieved hydrogel is preferably in the range 45–1000 $\mu$m, particularly preferably 45–850 $\mu$m most preferably 200–850 $\mu$m.

To ascertain the quality of surface postcrosslinking, the dried hydrogel is tested using the test methods described hereinbelow:

METHODS

1) Centrifuge Retention Capacity (CRC):

This method measures the free swellability of the hydrogel in a teabag. About 0.200 g of dry hydrogel is sealed in a teabag (format: 60 mm×60 mm, Dexter 1234 T paper) and soaked for min in a 0.9% strength by weight sodium chloride solution. The teabag is then spun for 3 min in a customary commercial spindryer (Bauknecht WS 130, 1400 rpm, basket diameter 230 mm). The amount of liquid absorbed is determined by weighing the centrifuged teabag. The absorption capacity of the teabag itself is taken into account by determining a blank value (teabag without hydrogel), which is deducted from the weighing result (teabag with swollen hydrogel).

Retention CRC [g/g] =(weighing result for teabag—blank value—initial weight of hydrogel)/initial weight of hydrogel.

2) Absorbency under load (0.3/0.7 psi):

For the absorbency under load, 0.900 g of dry hydrogel is distributed uniformly on the screen base of a measuring cell. The measuring cell consists of a Plexiglass cylinder (50 mm in height and 60 mm in diameter) whose base is formed by adhering a screen of steel mesh (mesh size 36 micron or 400 mesh). A coverplate is placed over the uniformly distributed hydrogel and loaded with an appropriate weight. The cell is then placed on a filter paper (S&S 589 Schwarzband, diameter=90 mm) lying on a porous glass filter plate, this filter plate itself lying in a Petri dish (30 mm in height, 200 mm in diameter) which contains 0.9% strength by weight sodium chloride solution so that the liquid level at the beginning of the experiment is level with the top edge of the glass frit. Hydrogel is then left to absorb the salt solution for 60 min. Subsequently the complete cell with the swollen gel is removed from the filter plate and the apparatus is reweighed following removal of the weight.

Absorbency under load (AUL) is calculated as follows:

$$AUL [g/g]=(W_b-W_a)/W_s$$

where

Wb is the mass of the apparatus+gel after swelling,

Wa is the mass of the apparatus+initial weight of the gel before swelling, and

Ws is the initial weight of dry hydrogel.

The apparatus is measuring cylinder+coverplate.

EXAMPLES 1a and 1b

Base Polymer

In a 40 l plastic bucket, 6.9 kg of glacial acrylic acid are diluted with 23 kg of water. 45 g of pentaerythritol triallyl ether are added to this solution with stirring, and the sealed bucket is inertized by passing nitrogen through it. The polymerization is then initiated by adding about 400 mg of hydrogen peroxide and 200 mg of ascorbic acid. After the reaction has ended, the gel is mechanically comminuted and admixed with sufficient aqueous sodium hydroxide solution to provide a degree of neutralization of 75 mol %, based on the acrylic acid used. The neutralized gel is then dried on a roll dryer, ground with a pin mill and finally classified. This is the base polymer used in the subsequent examples.

The base polymer is sprayed in a Waring lab blender with crosslinker solution of the following composition: 4% by weight of methanol, 6% by weight of water and 0.20% by weight of N-acetyl-2-oxazolidinone, based on polymer used. The moist polymer is then divided into two portions which are each heat treated at 175° C. in a through circulation cabinet, one portion for min and the other for 60 min. The dried product is classified at 850 micron to remove lumps.

EXAMPLE 2

Base polymer as per Example 1 is sprayed with crosslinker solution in a Waring lab blender. The solution has a composition such that the following dosage is obtained, based on base polymer used: 0.25% by weight of N-acetyl-2-oxazolidinone, 4% by weight of propylene glycol and 6% by weight of water. The moist polymer is then dried at 175° C. for 60 min in a through circulation cabinet.

EXAMPLE 3

Base polymer as per Example 1 is sprayed with crosslinker solution in a plough share lab blender. The composition of the solution is such that the following dosage is achieved, based on base polymer used: 0.20% by weight of N-acetyl-2-oxazolidinone, 3% by weight of methanol and 7% by weight of water. The moist polymer is then dried in a pilot plant disk dryer at 180° C. for 25 min.

EXAMPLE 4

Base polymer as per Example 1 is sprayed with crosslinker solution in a plough share lab blender. The composition of the solution is such that the following dosage is achieved, based on base polymer used: 0.20% by weight of N-acetyl-2-oxazolidinone, 4% by weight of 1,2-propanediol, 6% by weight of water and 0.10% by weight of boric acid. The moist polymer is then dried in a pilot plant fluidized bed dryer at 200° C. for 10 min. The polymers prepared as per the above examples were tested. The results are reported in the table below.

TABLE

| | Drying temperature | Drying time | N-Acetyl-2-oxazolidinone | Catalyst | Solvent | CRC (g/g) | AUL 0.3 psi (g/g) | AUL 0.7 psi (4826.5 Pa) (g/g) |
|---|---|---|---|---|---|---|---|---|
| Example 1 Base polymer without surface crosslinking | — | — | — | — | — | 41 | 9 | 7 |
| Example 1a | 175° C. | 30 min | 0.20% | — | 4% MeOH + 6% H$_2$O | 35 | 36 | 19 |
| Example 1b | 175° C. | 60 min | 0.20% | — | 4% MeOH + 6% H$_2$O | 30 | 31 | 25 |
| Example 2 | 175° C. | 60 min | 0.25% | — | 4% PG + 6% H$_2$O | 31 | 32 | 25 |
| Example 3 | 180° C. | 25 min* | 0.20% | — | 3% MeOH + 7% H$_2$O | 32 | 33 | 26 |
| Example 4 | 200° C. | 10 min** | 0.20% | 0.1% H$_3$BO$_3$ | 4% PG + 6% H$_2$O | 26 | 28 | 25 |

MeOH = methanol
PG = propylene glycol
*Residence time in disk dryer
**Residence time in fluidized bed dryer
Percentages are by weight based on polymer used. Drying temperature and time relate to the heat treatment of the base polymer after it has been sprayed with surface postcrosslinking solution.

We claim:

1. A process for the gel and/or surface postcrosslinking of a water-absorbent polymer, comprising:

treating said water-absorbent polymer with a surface postcrosslinking solution, to obtain a treated water-absorbent polymer;

postcrosslinking said treated water-absorbent polymer to obtain a postcrosslinked water-absorbent polymer; and drying said polymer during and after said treating and said crosslinking by raising a temperature;

wherein the surface postcrosslinking solution comprises, dissolved in an inert solvent, as crosslinker a compound of formula I

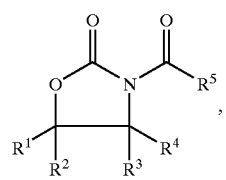

(I)

wherein $R^1$, $R^2$, $R^3$ and $R^4$ are each independently hydrogen, $C_1$–$C_{12}$-alkyl, $C_1$–$C_{12}$-alkenyl, $C_6$–$C_{12}$-aryl or $C_1$–$C_{12}$-alkoxy, $R^5$ is $C_1$–$C_{16}$-alkyl, $C_1$–$C_4$-hydroxyalkyl, $C_6$–$C_{12}$-aryl, $C_1$–$C_{16}$-alkenyl or a group of the formula —(CH$_2$)$_n$—COOH or —(CH$_2$)$_n$—SO$_3$H in the form of the acid or a respective metal salt, ammonium salt or triethanolammonium salt thereof or —(CH$_2$—CH$_2$—O—)$_m$—R$^6$, $R^6$ is hydrogen or $C_1$–$C_{16}$-alkyl, n is from 1 to 10, m is from 1 to 20.

2. The process of claim 1, wherein $R^5$ is —$(CH_2)_n$—COOM or —$(CH_2)_n$—$SO_3M$;
wherein n=1–10 and M=$Na^+$, $K^+$, $NH_4^+$ or (HO—$CH_2$—$CH_2$)$_3NH^+$.

3. The process of claim 1, wherein said water-absorbent polymer comprises structural units derived from acrylic acid or esters thereof or obtained by graft copolymerization of acrylic acid esters onto a water-soluble polymer matrix.

4. The process of claim 1, wherein surface postcrosslinking is effected using a catalyst comprising an acid or anhydride thereof.

5. The process of claim 4, wherein surface postcrosslinking is effected using a catalyst selected from the group consisting of boric acid, sulfuric acid, hydroiodic acid, phosphoric acid, tartaric acid, acetic acid, toluenesulfonic acid, an acidic salt of boric acid, an acidic salt of sulfuric acid, an acidic salt of hydroiodic acid, an acidic salt of phosphoric acid, an acidic salt of tartaric acid, an acidic salt of acetic acid and an acidic salt of toluenesulfonic acid.

6. The process of claim 1, wherein said inert solvent is water or a mixture of water and from 10 to 90% by weight of a mono- or polyhydric alcohol.

7. The process of claim 1, wherein said crosslinker is used in an amount of from 0.01 to 5% by weight, based on a weight of the polymer.

8. The process of claim 1, wherein in said crosslinker $R^1$, $R^2$, $R^3$ and $R^4$ are each hydrogen and $R^5$ is methyl.

9. A water-absorbent polymer prepared by the process of claim 1.

10. The process of claim 1, wherein said crosslinker of formula I is N-acetyl-2-oxazolidinone.

11. The process of claim 1, wherein said postcrosslinking temperature occurs at a temperature of from 50 to 250° C.

12. The process of claim 1, wherein surface postcrosslinking is effected using a catalyst selected from the group consisting of boron oxide, sulfur trioxide, diphosphorus pentoxide, and ammonium dihydrogenphosphate.

13. The process of claim 1, wherein said inert solvent is an aqueous solution of a member selected from the group consisting of methanol, ethanol, isopropanol, ethylene glycol, 1,2-propanediol and 1,3 propanediol.

14. The process of claim 1, wherein an amount of said surface postcrosslinking solution is 1–20% by weight based a weight of said water-absorbent polymer.

* * * * *